US010762493B2

(12) United States Patent
Kim

(10) Patent No.: US 10,762,493 B2
(45) Date of Patent: Sep. 1, 2020

(54) USER EQUIPMENT AND METHOD FOR SEARCHING MOBILE CARD BASED ON PATTERN RECOGNITION AND NON-TRANSITORY COMPUTER READABLE STORAGE MEDIUM HAVING COMPUTER PROGRAM RECORDED THEREON

(71) Applicant: SK Planet Co., Ltd., Seongnam-si (KR)

(72) Inventor: Juyoung Kim, Incheon (KR)

(73) Assignee: SK Planet Co., Ltd., Seongnam-si (KR)

( * ) Notice: Subject to any disclaimer, the term of this patent is extended or adjusted under 35 U.S.C. 154(b) by 49 days.

(21) Appl. No.: 15/965,557

(22) Filed: Apr. 27, 2018

(65) Prior Publication Data
US 2018/0247295 A1   Aug. 30, 2018

Related U.S. Application Data

(63) Continuation of application No. PCT/KR2016/005594, filed on May 26, 2016.

(30) Foreign Application Priority Data

Oct. 29, 2015   (KR) .................. 10-2015-0151337

(51) Int. Cl.
*G06Q 20/32* (2012.01)
*G06Q 20/38* (2012.01)
(Continued)

(52) U.S. Cl.
CPC ..... *G06Q 20/3227* (2013.01); *G06F 3/04883* (2013.01); *G06F 21/36* (2013.01);
(Continued)

(58) Field of Classification Search
CPC ................................... G06Q 20/3227
See application file for complete search history.

(56) References Cited

U.S. PATENT DOCUMENTS

2013/0239065 A1   12/2013   Lindberg et al.
2014/0035843 A1*   2/2014   Zo ..................... G06F 3/03542
                                                        345/173
(Continued)

FOREIGN PATENT DOCUMENTS

KR   10-2006-0030151 A   4/2006
KR   10-2014-0025680 A   3/2014
(Continued)

OTHER PUBLICATIONS

Feng, et al. (Feb. 2014), "TIPS: context-aware implicit user identification using touch screen in uncontrolled environments".*

*Primary Examiner* — Olabode Akintola
*Assistant Examiner* — Brandon M Duck
(74) *Attorney, Agent, or Firm* — Fenwick & West LLP

(57) ABSTRACT

The present disclosure provides a user equipment a method for searching a mobile card based on pattern recognition and a non-transitory computer readable storage medium storing a computer program, and more particularly, a user equipment and a method for searching a mobile card based on pattern recognition, which supports a user to conveniently find and use a desired card through pattern recognition among various mobile cards stored in the user equipment and a non-transitory computer readable storage medium storing a computer program.

3 Claims, 8 Drawing Sheets

(51) Int. Cl.
    *H04L 29/06*          (2006.01)
    *G06F 3/0488*        (2013.01)
    *G06Q 20/34*         (2012.01)
    *G06F 21/36*         (2013.01)
    *H04M 1/673*       (2006.01)

(52) U.S. Cl.
    CPC ............. *G06Q 20/32* (2013.01); *G06Q 20/34* (2013.01); *G06Q 20/3823* (2013.01); *H04L 63/083* (2013.01); *H04M 1/673* (2013.01); *H04M 2250/22* (2013.01)

(56) References Cited

U.S. PATENT DOCUMENTS

| | | | | |
|---|---|---|---|---|
| 2015/0205520 A1* | 7/2015 | Yim | .................... | G06F 3/04883 715/268 |
| 2015/0213448 A1* | 7/2015 | Subbaraj | ............ | G06Q 20/3276 705/40 |
| 2015/0269573 A1* | 9/2015 | Subbarao | ............. | G06Q 20/363 705/44 |
| 2015/0348014 A1* | 12/2015 | Van Os | .............. | G06Q 30/0631 705/41 |
| 2016/0140537 A1* | 5/2016 | Salcedo | ................. | G06Q 30/04 705/44 |

FOREIGN PATENT DOCUMENTS

| | | |
|---|---|---|
| KR | 10-2014-0043647 A | 4/2014 |
| KR | 10-2015-0033044 A | 4/2015 |
| KR | 10-1560448 B1 | 10/2015 |
| WO | WO 2017/073870 A1 | 5/2017 |

\* cited by examiner

USER EQUIPMENT AND METHOD FOR SEARCHING MOBILE CARD BASED ON PATTERN RECOGNITION AND NON-TRANSITORY COMPUTER READABLE STORAGE MEDIUM HAVING COMPUTER PROGRAM RECORDED THEREON

CROSS-REFERENCE TO RELATED APPLICATION(S)

This application is a Continuation of International Application No. PCT/KR2016/005594, filed on May 26, 2016 and designating the United States, and claims priority to Korean Patent Application No. 10-2015-0151337, filed on Oct. 29, 2015, the entirety of all of which are hereby incorporated by reference herein.

FIELD

The present disclosure relates to a user equipment and a method for searching a mobile card based on pattern recognition and a non-transitory computer readable storage medium having a computer program recorded thereon, and more particularly, to a user equipment and a method for searching a mobile card based on pattern recognition, which supports a user to conveniently find and use a desired card through pattern recognition among various mobile cards stored in the user equipment and a non-transitory computer readable storage medium storing a computer program recorded therein.

BACKGROUND

The statements in this section merely provide background information related to the present disclosure and may not constitute prior art.

With the development of a mobile communication technology, a wireless device such as a portable phone or a personal digital assistant (PDA) has been rapidly increasingly used and a service which is performed in a wireless Internet has also been gradually transferred to a wireless Internet based service.

Further, as a wireless network develops, a mobile based commercial transaction service is greatly developed and various mobile cards such as various credit cards and membership cards used in the corresponding commercial transaction service are stored in the wireless device of a user, and a desired mobile card is searched and displayed through the wireless device to provide a service which may be used in various stores.

However, the existing application that provides a function to store the mobile card on the wireless device and search and display the card desired to be used by the user is configured to operate so as to receive a search word from the user and find and display the mobile card corresponding to the search word, and as a result, a process in which the user inputs the search word associated with the mobile card is cumbersome. Therefore, there is inconvenience in searching and using the mobile card.

Moreover, when the mobile card in which the search word is duplicated exists, the existing application may search and display other mobile cards which are not the mobile card desired to be used by the user and a plurality of selection processes of displaying a plurality of mobile cards and selecting the card desired to be used by the user among the displayed mobile cards needs to be performed, and as a result, significant cumbersome occurs in searching and using the mobile card.

Accordingly, development of an alternative is required, which enables a user to conveniently search the mobile card desired to be used by minimizing the needed operation which occurs in a process of searching the existing mobile card.

SUMMARY

The present disclosure increases user convenience by provides a mobile card desired to be used by a user based on a pattern recognition among a plurality of mobile cards stored in a user equipment so that the user conveniently searches the desired mobile card and accuracy of searching the mobile card desired to be used is enhanced.

Further, the present disclosure provides the user convenience by immediately displaying the mobile card without separately executing the existing application by setting a pattern for the mobile card which is different from a pattern for unlocking in a locking screen and immediately switching the locking screen to a screen in which the mobile card is displayed when the input pattern matches the pattern for the mobile card.

One form of the present disclosure provides a user equipment for searching a mobile card based on pattern recognition, which may include: a storage unit configured to store data associated with each of mobile cards and stored pattern information corresponding to each of the mobile cards; a display unit configured to display the mobile cards; an input unit configured to receive a user input; and an application unit configured to display a pattern input interface through the display unit, generate user input pattern information based on the user input through the input unit via the pattern input interface, and display a mobile card of which the stored pattern information matches the user input pattern information, through the display unit.

As one example associated with the present disclosure, the display unit and an input unit may be constituted by a touch screen.

As one example associated with the present disclosure, the mobile card is any one of a credit card, a membership card, and a coupon card.

As one example associated with the present disclosure, the user equipment for searching a mobile card based on pattern recognition may further include a communication unit configured to communicate with a mobile card service providing apparatus that issues the mobile cards, wherein the application unit is configured to receive list information associated with the mobile cards from the mobile card service providing apparatus through the communication unit, display the received list information through the display unit, and receive, through the communication unit, data associated with a selected mobile card selected by a user from the list information based on user selection through the input unit and store the received data associated with the selected mobile card in the storage unit.

As one example associated with the present disclosure, the application unit may be configured to display, when the selected mobile card is a new mobile card, the pattern input interface for initial pattern setting through the display unit when receiving the data associated with the selected mobile card, generate the stored pattern information corresponding to the selected mobile card based on the user input through the input unit via the pattern input interface store the stored pattern information corresponding to the selected mobile card and the data associated with the selected mobile card in the storage unit, and output, when the stored pattern information corresponding to the selected mobile card generated for the initial pattern setting is same with any of the stored pattern information stored in the storage unit, error information so as to generate a different stored pattern information for the selected mobile card for the initial pattern setting.

As one example associated with the present disclosure, the application unit may be configured to display, when the user equipment is in a locking state, the pattern input interface in a locking screen through the display unit, generate the user input pattern information based on the user input through the input unit via the pattern input interface, display, when the mobile card of which the stored pattern information matches the user input pattern information exists, the mobile card of which the stored pattern information matches the user input pattern information through the display unit by switching the locking screen to a screen for displaying the mobile card.

As one example associated with the present disclosure, the application unit may be configured to release, when the user input pattern information based on the user input through the input unit via the pattern input interface in the locking screen matches a predetermined pattern information for unlocking the user equipment, the locking state of the user equipment.

As one example associated with the present disclosure, the application unit may be configured to guide the user to set the predetermined pattern information for unlocking the user equipment to be different from the stored pattern information for each of the mobile cards.

Another form of the present disclosure provides a method for searching a mobile card based on pattern recognition, which may include steps of: receiving, by an application unit of a user equipment, data associated with each of mobile cards from a mobile card service providing apparatus through a communication network and storing the received data associated with each of the mobile cards; displaying, by the application unit, a pattern input interface through the user equipment when storing the data associated with each of the mobile cards and setting stored pattern information corresponding to each of the mobile cards through the pattern input interface; and displaying, by the application unit, the pattern input interface when searching a mobile card from the mobile cards based on a user input, generating user input pattern information based on the user input via the pattern input interface, and displaying through the user equipment the mobile card of which the stored pattern information matches the user input pattern information.

Yet another form of the present disclosure provides a non-transitory computer-readable storage medium storing a computer program comprising a set of instructions, when executed, arranged to cause a user equipment to implement the method for searching a mobile card based on pattern recognition.

In some forms of the present disclosure, different patterns are set for each mobile card, and a mobile card which a user desires to use in a store may be conveniently searched and used by the user by simply inputting a pattern. Thereby accuracy of searching the mobile card is significantly enhanced and the use convenience of the mobile card stored in a user equipment is also enhanced.

Further, in some forms of the present disclosure, a pattern for searching the mobile card may be input in a locking screen of the user equipment, and when a pattern associated with the mobile card is input and recognized in the locking state of the user equipment, the mobile card corresponding to the pattern input by the user is displayed by immediately switching the locking screen, and as a result, mobile card use convenience may be significantly enhanced by a minimum manipulation of the user.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
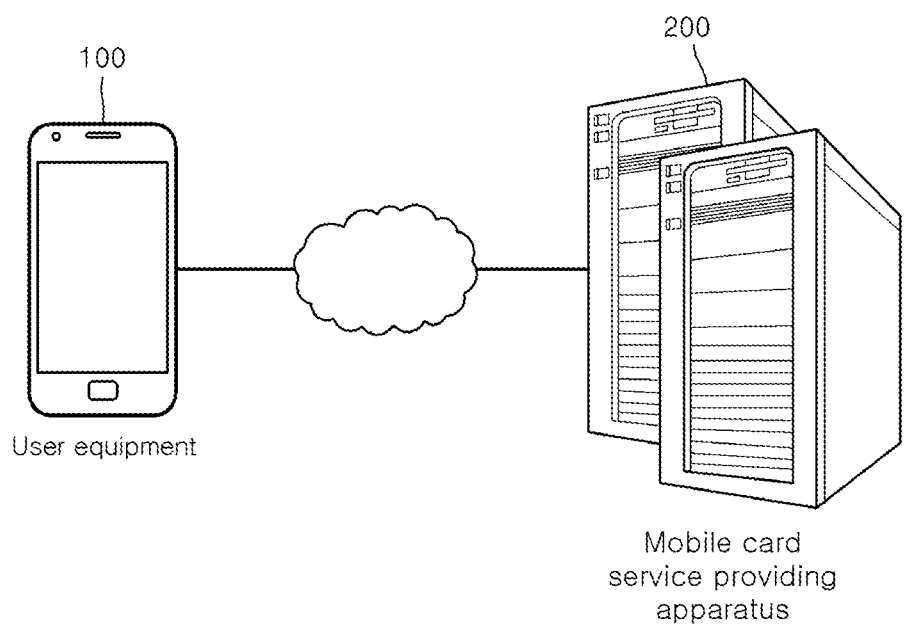
FIG. 1 is a configuration diagram for a system for searching a mobile card based on pattern recognition.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Technical terms used in the present disclosure are used only to describe specific forms, and are not intended to limit the present disclosure. Further, unless otherwise defined, the technical terms used in the present disclosure should be interpreted as meanings generally appreciated by those skilled in the art and should not be interpreted as excessively comprehensive meanings or excessively reduced meanings. Further, when the technical term used in the present disclosure is a wrong technical term that does not accurately express the spirit of the present disclosure, the technical term should be understood by being substituted by a technical term which can be correctly understood by those skilled in the art.

In addition, a general term used in the present disclosure should be interpreted as defined in a dictionary or contextually, and should not be interpreted as an excessively reduced meaning.

Further, singular expressions used in the present disclosure include plural expressions unless they have definitely opposite meanings in the context. In the present disclosure, a term such as "comprising" or "including" should not be interpreted as necessarily including all various components or various steps disclosed in some forms of the present disclosure, and it should be interpreted that some component or some steps among them may not be included or additional components or steps may be further included.

Further, terms including an ordinary number, such as first and second, and the like are used for describing various components, but the components are not limited by the terms. The above terms are used only to discriminate one component from the other components. For example, a first component may be referred to as a second component, and similarly, the second component may be referred to as the first component without departing from the scope of the present disclosure.

Hereinafter, some forms of the present disclosure will be described in detail with reference to the accompanying drawings, in which like reference numerals refer to like or similar elements regardless of reference numerals and a duplicated description thereof will be omitted.

Further, in the following description, a detailed explanation of known associated technologies may be omitted to avoid unnecessarily obscuring the subject matter of the present disclosure. Further, it is noted that the accompanying drawings are only for easily understanding the spirit of the present disclosure and it should not be interpreted that the spirit of the present disclosure is limited by the accompanying drawings.

FIG. 1 is a configuration diagram for a system for searching a mobile card based on pattern recognition in some forms of the present disclosure. As illustrated in FIG. 1, the system may include a mobile card service providing apparatus 200 that issues a mobile card capable of being downloaded and used in a user equipment 100, and the user equipment 100 that communicates with the mobile card service providing apparatus 200 through a communication network, requests a desired mobile card to be issued by the user to the mobile card service providing apparatus 200, downloads and stores data associated with the requested mobile card issued from the mobile card service providing apparatus 200 and then displays the mobile card selected by the user to be used.

In this case, in the user equipment 100, an application unit that manages the mobile card issued from the mobile card service providing apparatus 200 may be constituted. The application unit may perform various functions, such as requesting issuance of the mobile card to the mobile card service providing apparatus 200, displaying a user's desired card among the issued mobile cards through the user equipment 100, and managing points according to usage of the mobile card and payment history including a payment amount.

The conventional application installed in the user equipment 100 that manages existing mobile cards searches a desired card to be used by the user based on a search word input by the user to display a mobile card corresponding to the search word. However, according to this conventional configuration, it is significantly burdensome for the user to input the search word, and in order to accurately search the user's desired mobile card, a suitable and accurate search word for the corresponding mobile card needs to be input, but as the number of holding mobile cards increases, the number of mobile cards having similar search word is increased, and thus accuracy of the searching of the mobile card is decreased. Whereas, the application unit constituted in the user equipment 100 in some forms of the present disclosure may register and store different patterns for each mobile card issued. Thereby, the mobile card desired to be used by the user may be searched by only through the simple pattern input and the corresponding mobile may be displayed by the user equipment 100. As a result, user convenience for usage of the mobile card and accuracy of search of the mobile card can be largely improved.

That is, in some forms of the present disclosure, it is possible to set different patterns for each mobile card and support the user to conveniently search the mobile card desired to be used in a store only by the pattern input and simultaneously support the user to accurately find and use the desired mobile card, thereby largely improving convenience of use of the mobile cards stored in the user equipment 100.

Further, in some forms of the present disclosure, a pattern input may be input for searching and displaying the mobile card in the locking screen of the user equipment 100 and the user is able to use the mobile card with minimal operation by immediately switching and displaying the mobile card corresponding to the pattern input by the user on the locking screen in the case of recognizing the mobile card associated the input pattern on the locking screen, thereby largely improving convenience of use of the mobile card. Hereinafter, the configuration thereof will be described in detail.

Meanwhile, the mobile card described in some forms of the present disclosure may mean card information in which information on a real card is configured as data. For example, a mobile card associated with a credit card may include a card number, a card authentication value (an expiration date, a secret code, etc.), a card image, user information, and the like, and a mobile card such as a membership card or a coupon card may include a barcode image, a QR code image, user information, a card image, and the like.

Further, in the aforementioned configuration, the user equipment 100 may include various terminals, such as a smart phone, a portable terminal, a mobile terminal, a personal digital assistant (PDA), a portable multimedia player (PMP), a telematics terminal, a navigation terminal, a personal computer, a notebook computer, a slate PC, a tablet PC, an ultrabook, a wearable device (for example, including a smartwatch, a smart glass, a head mounted display (HMD), and the like), a Wibro terminal, an Internet protocol television (IPTV) terminal, a smart TV, a digital broadcasting terminal, an audio video navigation (AVN) terminal, an audio/video (A/V) system, and a flexible terminal, and the like.

Further, an example of the communication network described in some forms of the present disclosure may include a wireless communication network, such as wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), IEEE 802.16, long term evolution (LTE), long term evolution-advanced (LTE-A), wireless mobile broadband service (WMBS), Bluetooth, radio frequency identification (RFID), infrared data association (IrDA), ultra wideband (UWB), ZigBee, near field communication (NFC), ultra sound communication (USC), visible light communication (VLC), Wi- Fi, Wi-Fi direct, and the like. In addition, the communication network may also include a wired communication network, such as Power Line Communication (PLC), USB communication, Ethernet, serial communication, optical/coaxial cables.

Further, the aforementioned mobile card service providing apparatus 200 may be embodied in forms of various servers, such as a web server, a database server, and a proxy server.

Further, in the mobile card service providing apparatus 200, at least one of various software which allows a network load distribution mechanism to a service device to operate on the Internet or other networks may be installed, and as a result, the mobile card service providing apparatus 200 may be embodied by a computerized system.

Further, the network may be an http network and may be a private line, Intranet, or any other networks.

Furthermore, the mobile card service providing apparatus 200 and the user equipment 100 may be connected to each other by a security network so as to prevent the data from being attacked by any hacker or other third parties.

Further, the mobile card service providing apparatus 200 may include a plurality of database servers, and the database server may be embodied to be separately connected with the mobile card service providing apparatus 200 through any type of network connection including a distributed database server architecture.

Hereinafter, a detailed operation example for the user equipment 100 for searching the mobile card based on pattern recognition in some forms of the present disclosure will be described with reference to the aforementioned configuration.

Figure 2:
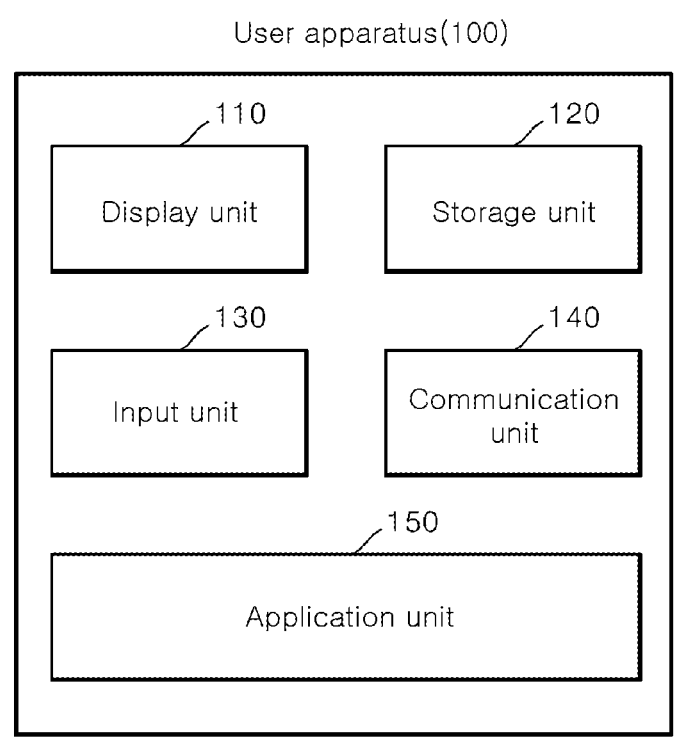
FIG. 2 is a detailed configuration diagram for a user equipment for searching the mobile card based on pattern recognition.

First, FIG. 2 is a detailed configuration diagram of the user equipment 100 for searching the mobile card based on pattern recognition in some forms of the present disclosure. As described in FIG. 2, the user equipment 100 may include a display unit 110, a storage unit 120, an input unit 130, a communication unit 140, and an application unit 150.

First, the communication unit 140 may support communication with the mobile card service providing apparatus 200 through a communication network.

Further, the storage unit 120 may store data associated with each of the mobile cards issued by the mobile card service providing apparatus 200.

Further, the input unit 130 may receive a user input.

Further, the display unit 110 may display the mobile card through the data associated with each of the mobile cards.

Meanwhile, the application unit 150 may receive various kinds of information and contents by communicating with the mobile card service providing apparatus 200 by the communication unit 140 to store the received information and contents in the storage unit 120 and display the stored information and contents by the display unit 110. In addition, the application unit 150 may display user input information received based on a user input through the input unit 130 or transmit the displayed user input information to the mobile card service providing apparatus 200 through the communication unit 140.

Further, the application unit 150 may provide various functions described in some forms of the present disclosure by storing application data for managing the mobile card and the data associated with the mobile card issued from the mobile card service providing apparatus 200 in the storage unit 120 and loading the data stored in the storage unit 120.

In this case, the application unit 150 may be configured by a control unit including a RAM, a ROM, a CPU, a GPU, and a bus, and executes and provides the overall control functions and the aforementioned services of the user equipment 100 by using a program and the data stored in the storage unit 120 through the control unit.

Further, the RAM, the ROM, the CPU, the GPU, and the like of the application unit 150 may be connected to each other through the bus.

The CPU accesses the storage unit 120 to perform booting by using an O/S stored in the storage unit 120 and may perform various operations by using various programs, contents, data, and the like stored in the storage unit 120.

Figure 3:
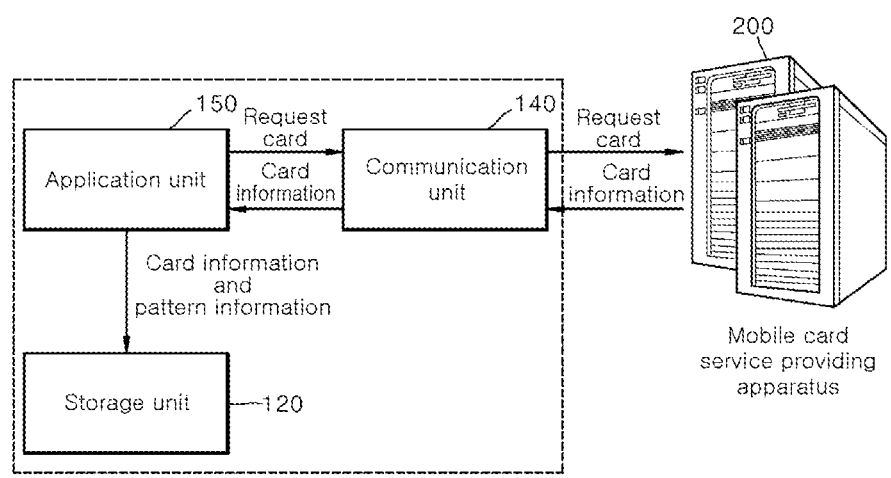
FIG. 3 is an form for an operation of issuing the mobile card of the user equipment for searching the mobile card based on pattern recognition.

Based on the aforementioned configuration, when describing a process of issuing the mobile card of the user equipment and an example for pattern registration through FIG. 3, as illustrated in FIG. 3, the application unit 150 configured in the user equipment 100 may communicate with the mobile card service providing apparatus 200 through the communication unit 140 by executing the application for managing the mobile card.

In this case, the application unit 150 may receive list information associated with a plurality of mobile cards from the mobile card service providing apparatus 200 through the communication unit 140 to display the received list information through the display unit 110.

Further, the application unit 150 may transmit card issuance request information including selection information and user ID information on a card desired to be issued by the user in the list information based on the user selection through the input unit 130 to the mobile card service providing apparatus 200 through the communication unit 140.

As a result, the mobile card service providing apparatus 200 may issue a mobile card corresponding to the card issuance request information received from the user equipment 100 to transmit card information associated with the mobile card to be issued to the user equipment 100.

Thereafter, the application unit 150 configured in the user equipment 100 may receive the card information associated with the mobile card to be issued through the communication unit 140 to store the received card information in the storage unit 120.

As such, the user equipment 100 may store various kinds of different mobile cards issued from the mobile card service providing apparatus 200.

In this case, the application unit 150 configured in the user equipment 100 may set a different pattern based on a user input for each mobile card in order to improve convenience of search for the mobile card desired to be used.

Figure 4:
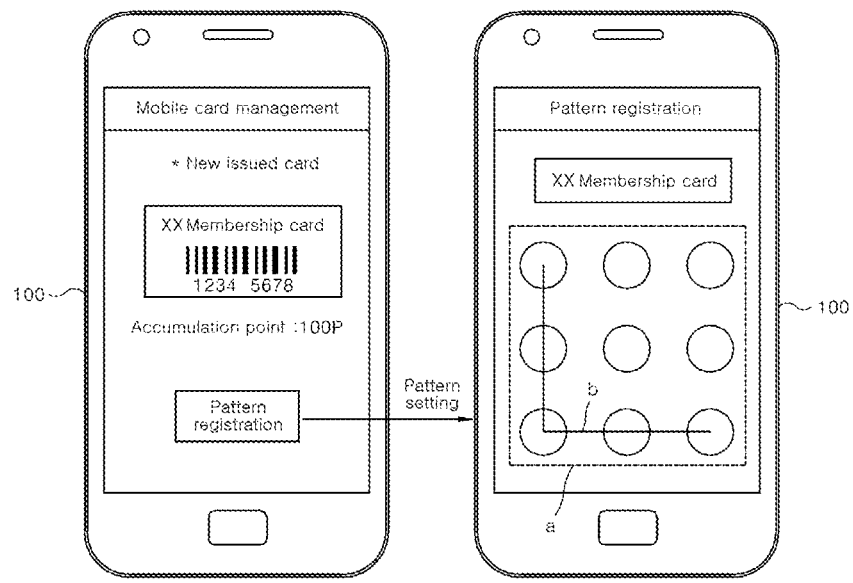
FIG. 4 is an form for an operation of registering a pattern for each mobile card of the user equipment for searching the mobile card based on pattern recognition.
Figure 5:
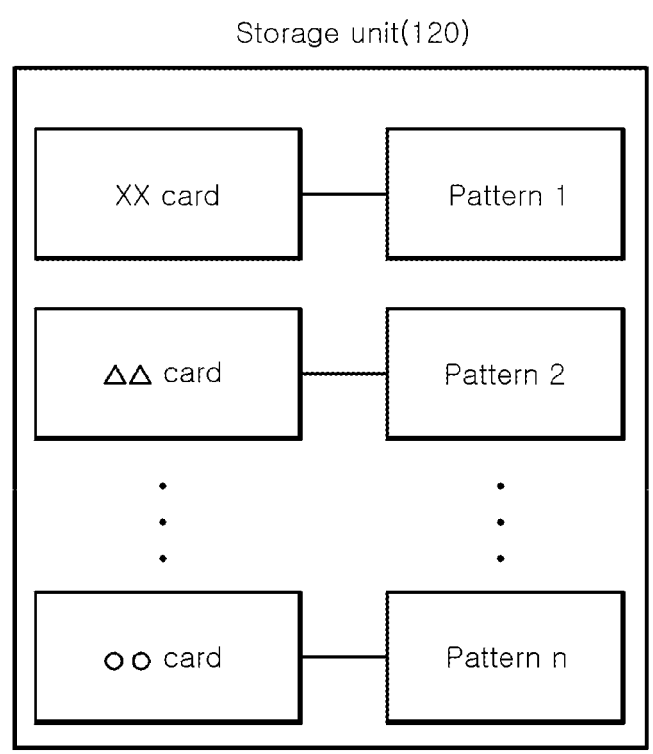
FIG. 5 is a configuration diagram for a storage unit constituted in the user equipment for searching the mobile card based on pattern recognition.

When describing the configuration thereof through FIG. 4, as illustrated in FIG. 4, the application unit 150 may receive and store the mobile card issued from the mobile card service providing apparatus 200 and provide an interface for inputting a pattern to be set (registered) for the corresponding mobile card.

To this end, the application unit 150 may load data associated with a predetermined pattern input interface, when registering a pattern for the mobile card selected by the user based on the user input through the input unit 130, to display the pattern input interface through the display unit 110.

Further, the application unit 150 may generate pattern information by recognizing a pattern b which is inputted in the pattern input interface based on the user input through the input unit 130 displayed through the display unit 110 and register the recognized pattern b for the mobile card selected by the user by matching the generated pattern information with the card information on the mobile card selected by the user and storing the matched pattern information in the storage unit 120.

In this case, the application unit 150 may register information on different patterns for different mobile cards and store the registered information in the storage unit 120.

Further, when the corresponding mobile card is a new mobile card when receiving the dada associated with the mobile card (card information), the application unit 150 may display the pattern input interface for initial pattern setting (pattern registration) through the display unit 110 to immediately perform the pattern registration when issuing a new mobile card.

Further, the application unit 150 may output error information through the display unit 110 to input a different pattern from the existing pattern information in the case where the pattern information generated in the initial pattern setting (pattern registration) is same with one of the existing pattern information stored in the storage unit 120, while generating the pattern information based on the user input through the input unit 130 via the pattern input interface and then matching the generated pattern information with the data associated with the mobile card to store the generated pattern information in the storage unit 120.

In other words, the application unit 150 may output error information for inducing the pattern to be changed for newly issued mobile card in order to prevent duplication of the pattern information through the display unit 110 when the pattern information generated for newly issued mobile card is same with any of existing pattern information for the pre-existing mobile cards stored in the storage unit 120.

Further, the application unit 150 may display the pattern input interface through the display unit again after outputting the error information and receive a pattern for the newly issued mobile card which is different from the registered pattern for pre-existing mobile card and register the different pattern for the newly issued mobile card.

As a result, the application unit 150 may prevent the same pattern from being registered for different mobile cards.

Figure 6:
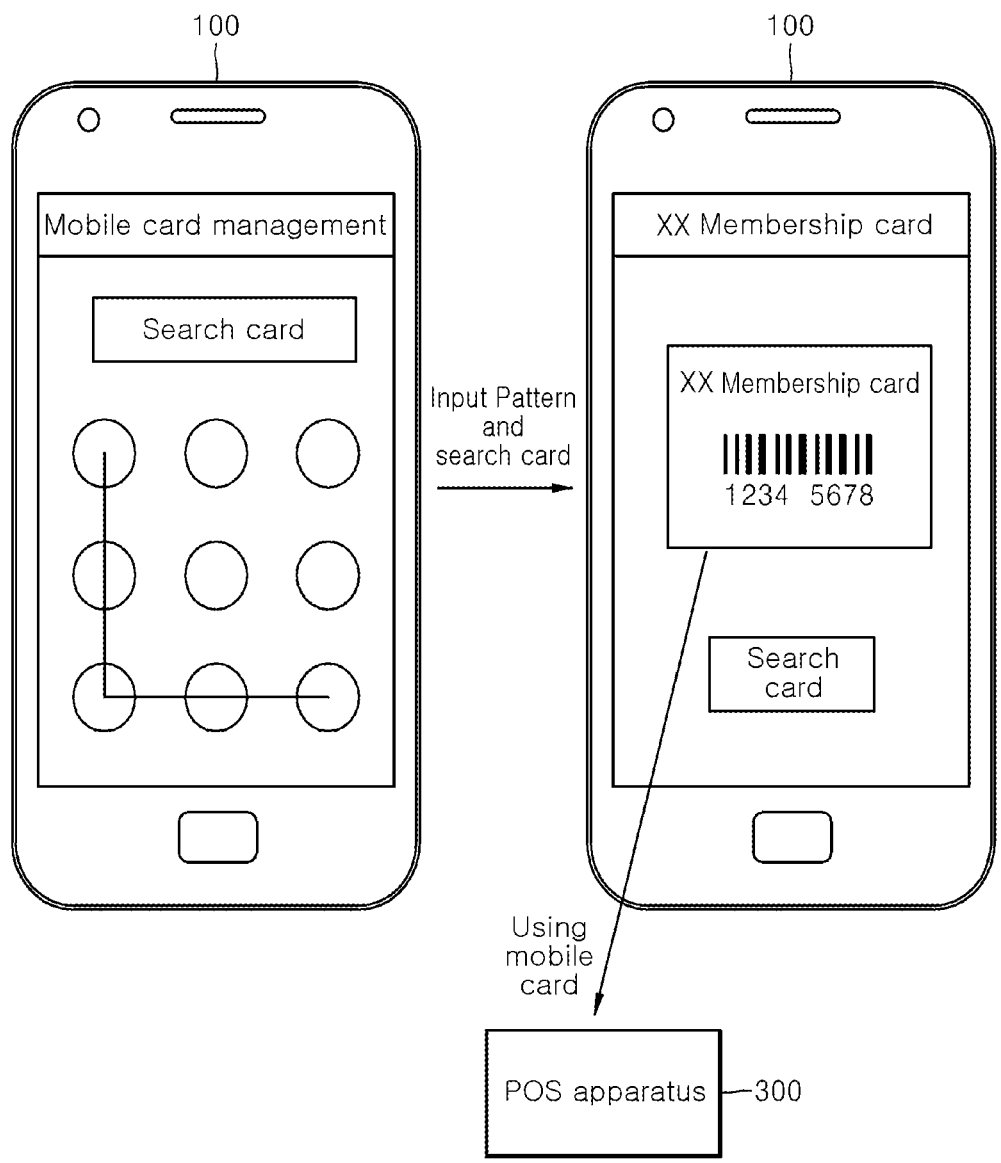
FIG. 6 is an form for an operation of searching and using the mobile card of the user equipment for searching the mobile card based on pattern recognition.

Meanwhile, when the pattern registration process described above is completed, the application unit 150 provides a search function for using the mobile card to the user and may improve user's convenience by searching the mobile card based on the input pattern by the user, and this will be described with reference to FIG. 6.

The application unit 150 configured in the user equipment 100 provides a search function for searching the mobile card and may display a pattern input interface for inputting the pattern through the display unit 110 as described above when the corresponding search function is selected based on the user input.

Accordingly, the application unit 150 may generate pattern information based on the user input through the input unit 130 via the pattern input interface and compare the user input pattern information with pattern information for each mobile card prestored in the storage unit 120.

Thereafter, the application unit 150 may extract mobile card data associated with a pattern which matches with the pattern information generated based on the user input pattern through the pattern input interface. Further, the application unit 150 may display the extracted mobile card data through the display unit 110.

Thereafter, a point of sale (POS) apparatus 300 installed in the store may generate saving information for saving points according to a payment amount of the user in response to the corresponding mobile card by recognizing the mobile card displayed on the user equipment 100 to transmit the generated saving information to the mobile card service providing apparatus 200 through the communication network, or receive point information according to recognition of the mobile card displayed on the user equipment 100 in the payment amount from the mobile card service providing apparatus 200 through the communication network to use payment of goods.

As a detailed example thereof, the application unit 150 may recognize the pattern input by the user through the pattern input interface and display card information, which is associated with the mobile card corresponding to the pattern input by the user, including a barcode, and the barcode displayed on the user equipment 100 may be recognized through a barcode reader to generate barcode information and then transmit the generated barcode information to the mobile card service providing apparatus 200.

Accordingly, the mobile card service providing apparatus 200 may transmit the saved point information for the user's mobile card corresponding to the barcode information to the POS apparatus 300.

Thereafter, the POS apparatus 300 transmits saving information for new points generated in response to the payment amount according to user's selection to the mobile card service providing apparatus 200 and adds the transmitted saving information to the existing point information to save the new points or transmits used point information when using the points according to the point information received from the mobile card service providing apparatus 200 and reduces points corresponding to the used points in the existing point information according to the used point information transmitted from the POS apparatus 300 transmits in the mobile card service providing apparatus 200 to update the point information stored in the mobile card service providing apparatus 200.

Further, the application unit 150 may display a search button for searching another mobile card while any one mobile card is displayed through the display unit 110 together with the mobile card, display the pattern input interface through the display unit 110 when the search button is selected by manipulation of the user, and display another mobile card corresponding to the user's pattern input through the pattern input interface through the display unit 110.

As such, the application unit 150 supports the user to facilitate conversion for a plurality of mobile cards usable in the store through the pattern input interface thereby convenience of use for the user's mobile card is largely improved.

As described above, in some forms of the present disclosure, it is possible to set different patterns for each mobile card and support the user to conveniently search the mobile card desired to be used in a store only by inputting the corresponding pattern and simultaneously support the user to accurately find and use the desired mobile card, thereby convenience of use of the mobile cards stored in the user equipment 100 is largely improved.

That is, in some forms of the present disclosure, it may be possible to set different patterns for each mobile card and the user is able to conveniently search the mobile card desired to be used in a store only by the pattern input and it is possible to simultaneously support the user to accurately find and use the desired mobile card, thereby convenience of use of the mobile cards stored in the user equipment 100 may be largely improved. In addition, it may also be possible to precisely distinguish the mobile card desired to be used by the user among the plurality of mobile cards stored in the user equipment 100 from other mobile cards through the recognition of the pattern inputted by the user and accurately display the corresponding mobile card, thereby accuracy of search for the desired mobile card may also be improved.

Meanwhile, in the aforementioned configuration, the input unit 130 configured in the user equipment 100 receives a signal based on the button operation or any function selection by the user, receives a command or a control signal generated by an operation such as touching/scrolling the displayed screen, or receives a signal corresponding to the information input by the user. In addition, the input unit 130 may use various devices, such as a key pad, a dome switch, a touch pad (static pressure/static electricity), a touch screen, a jog wheel, a jog switch, a jog shuttle, a mouse, a stylus pen, and a touch pen.

In addition, the display unit 110 may display various contents such as various menu screens and the like by using a user interface and/or a graphic user interface stored in the storage unit 120 by the control of the control unit (application unit).

Here, the contents displayed on the display unit 110 include a menu screen including various texts or image data (including various information data) and data such as icons, a list menu, and a combo box, and the like.

Further, the display unit 110 may be a touch screen, and the input unit 130 and the display unit 110 may be configured by the touch screen.

In this case, a touch sensor for sensing a touch gesture of the user may be included in the display unit 110 or the input unit 130.

The touch sensor may be one of various types such as a capacitive type, a decompressive type, and a piezoelectric type.

In the case of the capacitive type, when a part of a user's body touches a surface of the touch screen by using a dielectric coated on the surface of the touch screen, a touch coordinate is calculated by sensing minute electricity excited to the user's body.

In the case of the decompressive type, two electrode plates are embedded in the touch screen, and when the user touches the screen, upper and lower electrode plates contact each other at the touched position and then current flows, and the touch coordinate is calculated by sensing the flow of the current.

In addition, the user equipment 100 may support a pen input function, and in this case, a user's gesture using an input means such as a pen rather than the part of the user's body may be sensed.

As an example, in the case where the input means is a stylus pen including a coil therein, the user equipment 100 may include a magnetic field sensor for sensing a magnetic field changed by the coil in the stylus pen. In this case, an approaching gesture of the user such as hovering in addition to the touch gesture of the user may be sensed.

In addition, the display unit 110 may be embodied by at least one type of a liquid crystal display (LCD), a thin film transistor-liquid crystal display (TFT LCD), an organic light-emitting diode (OLED), a flexible display, a 3D display, an e-ink display, and a light emitting diode (LED) and may include a driving circuit, a backlight unit, and the like for the display.

Further, the display unit 110 may be constituted as a stereoscopic display unit displaying a stereoscopic image.

A 3D display type such as a stereoscopic type (a glasses type), an auto-stereoscopic type (a glassless type), and a projection type (a holographic type) may be applied to the stereoscopic display unit.

Further, the display unit 110 displays a credit card number and the like of the mobile card (alternatively, including a mobile credit card, a check card, a prepaid card, a membership card, and the like) issued from the mobile card service providing apparatus 200 by the control of the control unit (the application unit).

Further, the user equipment 100 may further include a voice output unit and the corresponding voice output unit outputs voice information included in a predetermined signal processed by the control unit (the application unit).

Here, the voice output unit may include a receiver, a speaker, a buzzer, and the like.

Further, the voice output unit outputs a guidance voice generated by the control unit (the application unit).

Further, the voice output unit outputs voice information corresponding to a credit card number and the like of the mobile card (alternatively, including a mobile credit card, a check card, a prepaid card, a membership card, and the like) issued from the mobile card service providing apparatus 200 by the control unit (the application unit).

The communication unit 140 communicates with any internal component or at least one of any external terminal via the wired/wireless communication network.

In this case, any external terminal may include a network service system, a server, and the like.

Further, the communication unit 140 may support wireless communication schemes including wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), IEEE 802.16, long term evolution (LTE), long term evolution-advanced (LTE-A), wireless mobile broadband service (WMBS), Bluetooth, radio frequency identification (RFID), infrared data association (IrDA), ultra wideband (UWB), ZigBee, near field communication (NFC), ultra sound communication (USC), visible light communication (VLC), Wi-Fi, Wi-Fi direct, and the like. In addition, the communication unit 140 may support wired communication schemes including power line communication (PLC), USB communication, Ethernet, serial communication, optical/coaxial cable, and the like.

Further, the storage unit 120 stores data, programs, applications and the like which are required to operate the user equipment 100.

That is, the storage unit 120 may store a plurality of application programs (alternatively, applications) driven in the user equipment 100 and data, commends, and the like for the operation of the user equipment 100. At least some of the application programs may be downloaded from an external server through wireless communication.

Further, at least some of the application programs may be present on the user equipment 100 from a delivery time for basic functions (for example, phone receipt and call functions and message receiving and sending functions) of the user equipment 100.

Meanwhile, the application program is stored in the storage unit 120 and installed in the user equipment 100 to be driven to perform an operation (alternatively, a function) of the user equipment 100 by the control unit 150 of the user equipment 100.

In addition, the storage unit 120 may include at least one storage medium of a flash memory type, a hard disk type, a multimedia card micro type, a card type memory (for example, an SD or XD memory, or the like), a magnetic memory, a magnetic disk, an optical disk, a RAM, a SRAM, a ROM, an EEPROM, and a PROM.

Further, the user equipment 100 may operate a web storage performing a storage function of the storage unit 120 on the Internet or operate in association with the web storage.

Further, the storage unit 120 stores a credit card number and the like of the mobile card (alternatively, including a mobile credit card, a check card, a prepaid card, a membership card, and the like) according to membership information issued from the mobile card service providing apparatus 200 by the control of the control unit (the application unit).

Further, the user equipment 100 may further include an interface unit (not illustrated) serving as an interface with all external devices connected to the corresponding user equipment 100.

For example, the interface unit may be constituted by a wired/wireless headset port, an external charger port, a wired/wireless data port, a memory card port, a port connecting devices with identification modules, an audio input/output (I/O) port, a video input/output (I/O) port, an earphone port, and the like.

Here, the identification module may be a chip storing various information for authenticating a permission of the user equipment 100 and may include a user identity module (UIM), a subscriber identity module (SIM), a universal subscriber identity module (USIM), and the like. Further, the device provided with the identification module may be prepared in a smart card form.

Accordingly, the identification module may be connected with the user equipment 100 through the port. Such an interface unit receives data or power from an external device to transmit the received data or power to each component in the user equipment 100 or transmit the data in the user equipment 100 to the external device.

Further, the interface unit may be a passage through which the power from a cradle is supplied to the corresponding user equipment 100 when the user equipment 100 is connected with an external cradle or a passage through which various command signals input from the cradle by the user is transferred to the corresponding user equipment 100.

Various command signals input from the cradle or the corresponding power may also operate by a signal for recognizing that the user equipment 100 is accurately installed on the cradle.

Further, the user equipment 100 may further include a separate input unit 130 for receiving a signal according to a button operation or any function selection by the user or receiving a command or a control signal generated by an operation such as touching/scrolling the displayed screen.

Figure 7:
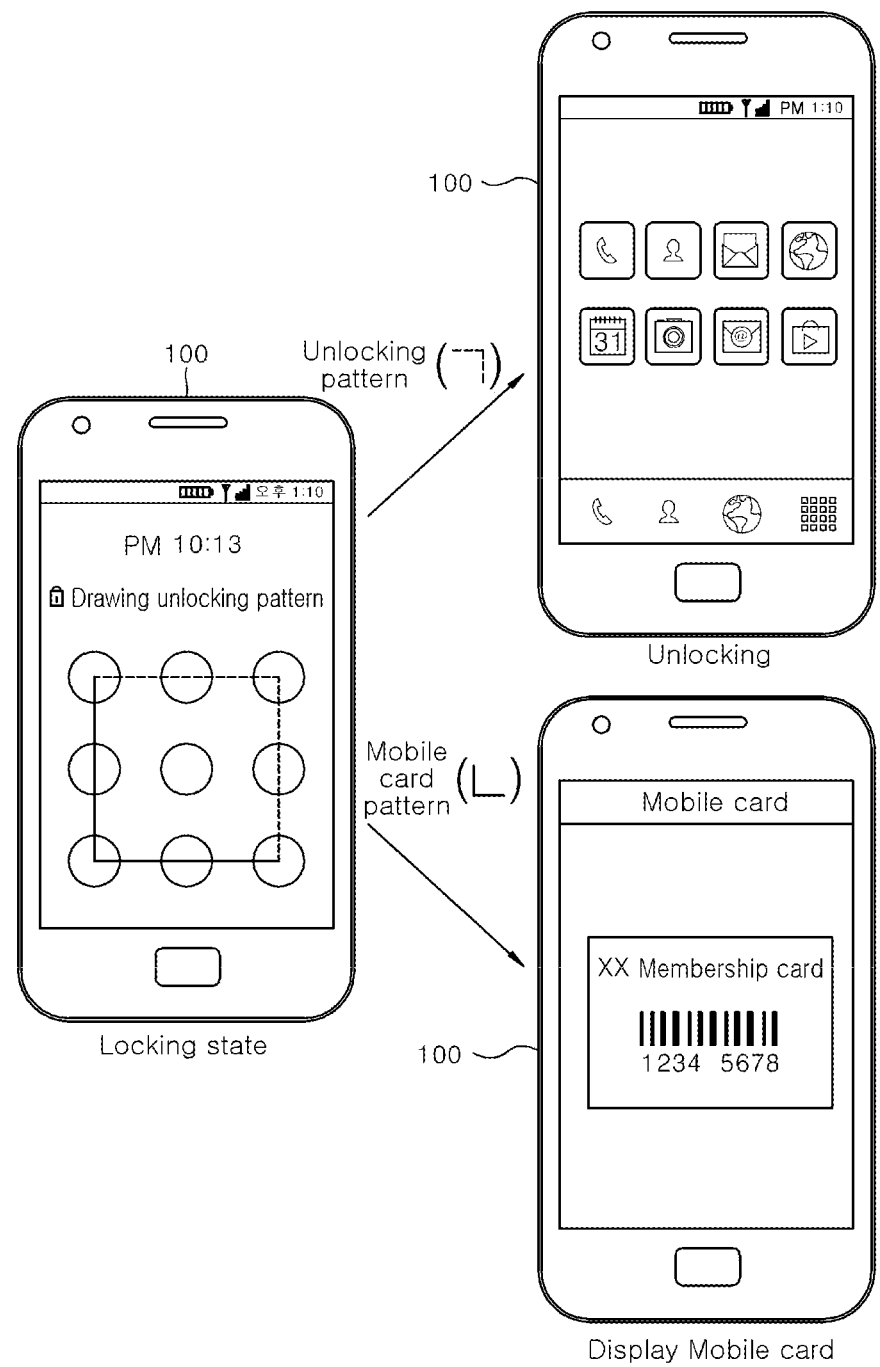
FIG. 7 is an form for an operation of searching the mobile card using a locking screen of the user equipment for searching the mobile card based on pattern recognition.

Meanwhile, in addition to the aforementioned configuration, the user equipment 100 for searching the mobile card based on pattern recognition in some the forms of the present disclosure displays a pattern input interface in a locking screen state and recognizes a pattern based on the user input through the corresponding pattern input interface to immediately display the mobile card when the pattern corresponding to the mobile card is recognized, thereby convenience of use of the mobile card is improved, and this will be described in detail with reference to the configuration of FIG. 7.

Before the detailed description thereof, the "locking screen" associated with some forms of the present disclosure will be described.

Generally, in the user equipment 100 including a mobile terminal which is currently distributed, a locking state is set to prevent malfunction due to a continuous input by the touch screen or the external input button regardless of a user's intention.

When the user equipment is in such a locking state, the locking screen is displayed on the display when the user equipment 100 is initially driven, and the locking screen may include a pattern input interface for receiving a predetermined pattern for release of the locking screen.

As a result, the user equipment 100 releases the lock state only when the same pattern as a predetermined pattern for release of the locking screen is inputted through the pattern input interface so that a desired function can be used.

Accordingly, since the locking screen is a screen which is necessarily encountered when the user equipment 100 is activated, when the pattern associated with the mobile card is input via the pattern input interface displayed through the corresponding locking screen, the mobile card is provided to be immediately used, thereby convenience of use of the mobile card is largely improved.

Accordingly, referring to FIG. 7, the application unit 150 configured in the user equipment 100 may execute applications associated with the mobile card in a background state and display the locking screen through the display unit 110 when the user equipment 100 is activated through the input unit 130.

In this case, the application unit 150 may switch the user equipment 100 to an inactivated state such as a sleep mode when there is no user input through input unit 130 for a predetermined time or an inactivation associated input such as a sleep mode is received through the input unit 130, and switch the user equipment 100 to an activated state such as a wake-up mode when an activation associated input is received based on the user input through the input unit 130 in the inactivated state.

Further, the application unit 150 may set the user equipment 100 from the inactivated state to the locking state.

Accordingly, the application unit may display the locking screen through the display unit 110 when the user equipment 100 is switched to the activated state and display the pattern input interface through the locking screen.

In this case, the application unit 150 accesses the predetermined set information in response to the locking screen to replace the pattern input interface displayed on the locking screen based on the corresponding set information with a pattern input interface including a pattern input function for searching the mobile card and a pattern input function for releasing the locking screen.

Meanwhile, pattern information for releasing the locking screen (the locking state) may be preset in the storage unit 120 or the application unit 150, and the application unit 150 may change a pattern according to the pattern information for releasing the locking screen by the user input through the input unit 130.

As a result, the application unit 150 may generate pattern information by recognizing the pattern based on the user input through the input unit 130 via the pattern input interface displayed on the locking screen displayed through the display unit 110 together and compare the generated pattern information with predetermined pattern information for releasing the locking state and the pattern information stored in the storage unit 120.

Accordingly, the application unit 150 may release the locking screen when the pattern information generated through the pattern input interface displayed on the locking screen matches with the pattern information for releasing the locking state and provide an initial menu screen to allow the user to use a desired function.

Further, the application unit 150 may load the mobile card stored in the storage unit 120 of which the pattern information matches with the pattern information generated based on the user input pattern through the pattern input interface displayed on the locking screen and display the mobile card through the display unit 110 by immediately switching the locking screen to a screen for displaying the mobile card.

As a result, when the user uses the mobile card on the locking screen, the user inputs the pattern corresponding to a pattern for the mobile card desired to be used through the pattern input interface included in the locking screen to immediately display the mobile card on the display unit 110 of the user equipment 100.

As described above, some forms of the present disclosure may provide a pattern input interface for searching and displaying the mobile card on the locking screen of the user equipment 100 and support the user to use the mobile card with minimal operation by immediately switching and displaying the corresponding mobile card in the case of recognizing a pattern input of the mobile card on the locking screen, thereby convenience of use of the mobile card is largely improved.

Meanwhile, in the aforementioned configuration, of course, the application unit 150 may guide a user to input a pattern which is different from the predetermined pattern information for releasing the locking state (alternately, the locking screen) when registering a pattern for a mobile card.

Figure 8:
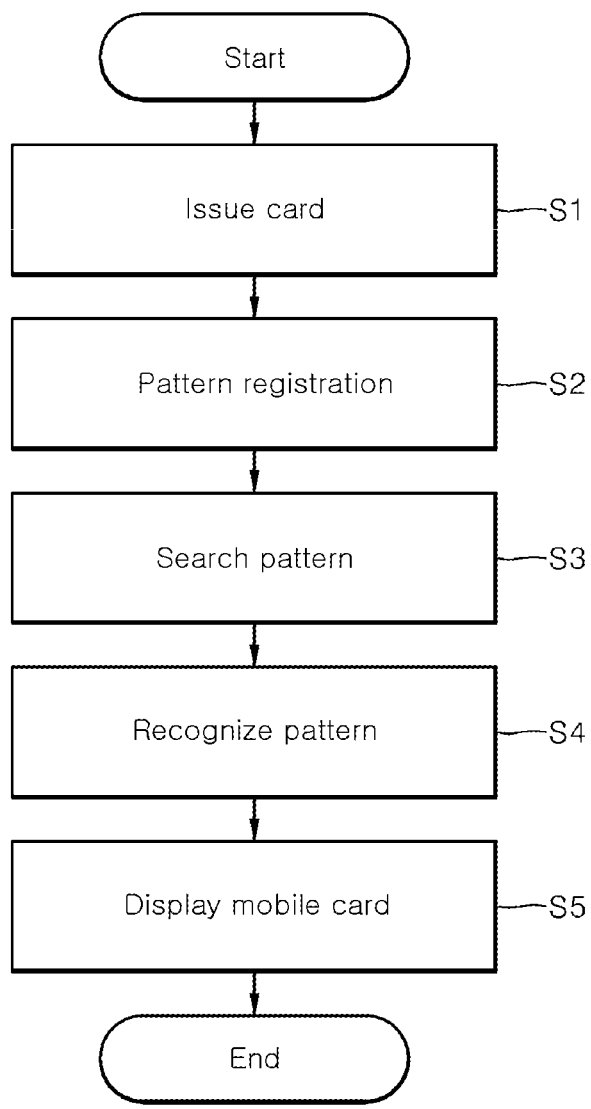
FIG. 8 is a flowchart of a method for searching a mobile card based on pattern recognition.

FIG. 8 is a flowchart of a method for searching a mobile card based on pattern recognition in another form of the present disclosure. As illustrated in FIG. 8, the user equipment 100 may communicate with the mobile card service providing apparatus 200 by executing an application for managing the mobile card.

Further, the user equipment 100 may receive and display list information associated with a plurality of mobile cards provided by the mobile card service providing apparatus 200.

Further, the user equipment 100 may transmit card issuance request information including selection information on a desired card to be issued by the user in the list information based on the user selection and user identification information to the mobile card service providing apparatus 200.

As a result, the mobile card service providing apparatus 200 may issue a mobile card corresponding to the card issuance request information received from the user equipment 100 and transmit card information associated with the mobile card to be issued to the user equipment 100.

Thereafter, the user equipment 100 may receive and store the card information associated the mobile card to be issued.

As such, various kinds of different mobile cards from the mobile card service providing apparatus 200 may be issued and stored in the user equipment 100 (S1).

In this case, the user equipment 100 may set (register) a pattern based on a user input in for each mobile card in order to improve convenience of search for the issued mobile card.

When describing the configuration thereof, the user equipment 100 receives and stores the issued mobile card from the mobile card service providing apparatus 200 and may set a pattern for the corresponding mobile card.

To this end, the user equipment 100 may load data associated with a predetermined pattern input interface when registering the pattern for the mobile card based on the user input and display the corresponding pattern input interface.

Further, the user equipment 100 may generate pattern information by recognizing the pattern input by the user based on the user input through the displayed pattern input interface and register the pattern for the mobile card by matching and storing the generated pattern information with the card information on the mobile card.

In this case, the user equipment 100 may register and store different pattern information for different mobile cards.

Further, when the corresponding mobile card is a new mobile card at the time of receiving the data associated with the mobile card (card information), the user equipment 100 may display the pattern input interface for initial pattern setting (pattern registration) to immediately perform the pattern registration at the time of issuance of the new mobile card.

Further, the user equipment 100 may output error information to guide the user to input a different pattern from the existing pattern information in the case where the pattern information generated in the initial pattern setting (pattern registration) is same as the existing pattern information prestored, while generating the pattern information by recognizing the pattern based on the user input through the pattern input interface and then matching and storing the generated pattern information with the data associated with the mobile card.

In other words, the user equipment 100 may output error information for inducing the pattern to be changed in order to prevent duplication of the pattern information when the pattern information generated recently for any one mobile card is same with the predetermined pattern information for another different mobile card.

As a result, the user equipment 100 may prevent the same pattern from being registered for different mobile cards.

Meanwhile, when the pattern registration process described above is completed, the user equipment 100 provides a search function for a mobile card desired to be used by the user and may improve user's convenience by enabling the search of the mobile card based on the input pattern by the user (S3).

In detail, the user equipment 100 provides a search function for searching the mobile card and may display a pattern input interface for inputting the pattern as described above when the search function is selected by the user.

Accordingly, the user equipment 100 may recognize the pattern inputted by the user through the pattern input interface, generate pattern information based on the user input pattern and compare the generated pattern information with prestored pattern information for each mobile card (S4).

Thereafter, the user equipment 100 may extract and display card information associated with a mobile card of which the pattern information matches the generated pattern information (S5).

Accordingly, a point of sale (POS) apparatus 300 installed in the store may generate saving information for saving points according to a payment amount of the user in response to the corresponding mobile card by recognizing the mobile card displayed on the user equipment 100 and transmit the generated saving information to the mobile card service providing apparatus 200 through the communication network, or receive point information according to recognition of the mobile card displayed on the user equipment 100 in the payment amount from the mobile card service providing apparatus 200 through the communication network to use payment of goods.

As a detailed example thereof, the user equipment 100 may recognize the pattern input by the user through the pattern input interface and display card information including a barcode associated with the mobile card corresponding to the user input pattern, and a barcode reader recognizes the barcode displayed on the user equipment 100 to generate barcode information and then transmit the generated barcode information to the mobile card service providing apparatus 200.

Thereafter, the mobile card service providing apparatus 200 may transmit the saved point information for the mobile card corresponding to the barcode information to the POS apparatus 300.

Thereafter, the POS apparatus 300 transmits saving information for new points generated in accordance with the payment amount according to user's selection to the mobile card service providing apparatus 200 and the transmitted saving information is added to the existing point information to save the new points or used point information is transmitted when the points is used according to the point information received from the mobile card service providing apparatus 200 and points corresponding to the used points is reduced in the existing point information according to the used point information. The POS apparatus 300 transmits the used point information to the mobile card service providing apparatus 200 so that the point information stored in the mobile card service providing apparatus 200 may be updated.

Further, the user equipment 100 may display a search button for searching another mobile card while any one mobile card is displayed, display the pattern input interface when the search button is selected, and display another mobile card corresponding to the user input pattern through the pattern input interface.

As such, the user equipment 100 supports the user to facilitate switching between a plurality of mobile cards usable in the store through the pattern input interface thereby convenience of use of the mobile card is largely improved.

As described above, in some forms the present disclosure, it may be possible to set different patterns for each mobile card and support the user to conveniently search the mobile card desired to be used in a store only by the pattern input and simultaneously support the user to accurately find and use the desired mobile card, thereby convenience of use of the mobile cards stored in the user equipment 100 is largely improved.

Meanwhile, in addition to the aforementioned configuration, the user equipment 100 may execute applications associated with the mobile card in a background state and display the locking screen at the time of activating the user equipment 100.

In this case, the user equipment 100 may be switched to an inactivated state such as a sleep mode when there is no user input through input unit 130 for a predetermined time or an inactivation associated input such as a sleep mode is received, and may be switched to an activated state such as a wake-up mode when an activation associated input is received based on the user input in the inactivated state.

Further, the user equipment 100 may be set from the inactivated state to the locking state.

Accordingly, the user equipment 100 may display the locking screen at the time of being switched to the activated state and display the pattern input interface through the locking screen.

Meanwhile, in the user equipment 100, pattern information for releasing the locking screen (the locking state) may be preset.

As a result, the user equipment 100 may generate pattern information by recognizing the pattern based on the user input through the pattern input interface displayed on the locking screen and compare the generated pattern information with the predetermined pattern information for releasing the locking state and the pattern information stored for each of the mobile cards.

Accordingly, the user equipment 100 may release the locking screen when the pattern information generated through the pattern input interface is same with the pattern information for releasing the locking state and provide an initial menu screen to allow the user to use a desired function.

Further, the user equipment 100 may load the stored mobile card of which the pattern matches with the pattern information generated through the pattern input interface. That is, when the pattern information generated through the pattern input interface displayed on the locking screen matches any one of pattern information associated with a plurality of mobile cards, and the user equipment 100 may display the mobile card corresponding to the pattern information generated based on the input pattern through the pattern input interface by immediately switching the locking screen to a screen for displaying the mobile card.

As a result, when the user uses the mobile card on the locking screen, the user inputs the pattern corresponding to the mobile card desired to be used through the pattern input interface included in the locking screen so that the mobile card is immediately displayed on the display unit 110 of the user equipment 100.

As described above, in some forms of the present disclosure, the user equipment 100 storing the mobile card issued from the mobile card service providing apparatus 200 sets a different pattern for each mobile card and supports the user to conveniently search the mobile card desired to be used in the store only by inputting the corresponding pattern, thereby convenience of the use of the mobile card is enhanced and supports the user to accurately find and use the desired mobile card based one the pattern, thereby accuracy of the searching of the desired mobile card is largely improved.

Furthermore, some forms of the present disclosure may provide a pattern input interface for searching and displaying the mobile card on the locking screen according to the locking state of the user equipment 100 and support the user to use the mobile card with minimal operation by immediately switching and displaying the locking screen to a screen for displaying the corresponding mobile card in the case of recognizing the mobile card associated pattern inputted via the pattern input interface on the locking screen, thereby convenience of use of the mobile card is largely improved.

The user equipment 100, the POS apparatus 300, and the mobile card service providing apparatus 200 described above may be embodied by a hardware component, a software component, and/or a combination of the hardware component and the software component.

Further, the components described in some forms of the present disclosure may be embodied by using one or more general computers or special purpose computers, such as a processor, a controller, an arithmetic logic unit (ALU), a digital signal processor, a microcomputer, a field programmable array (FPA), a programmable logic unit (PLU), a microprocessor, or other devices capable of executing and responding instructions.

The user equipment 100, the POS apparatus 300, and the mobile card service providing apparatus 200 may execute an operating system (OS) and one or more software applications which are performed on the OS.

Further, the user equipment 100, the POS apparatus 300, and the mobile card service providing apparatus 200 may approach, store, operate, process, and generate the data in response to the execution of the software.

For convenience of the understanding, the components may be described to be used, respectively, but those skilled in the art may determine that a processing device may include a plurality of processing elements and/or a plurality of types of processing elements.

For example, the user equipment 100, the POS apparatus 300, and the mobile card service providing apparatus 200 may include a plurality of processors or one processor and one controller.

Further, another processing configuration such as a parallel processor is possible.

The software may include a computer program, a code, an instruction, or one or more combinations thereof, and may operate the user equipment 100, the POS apparatus 300, and various servers as desired or independently or collectively instruct the user equipment 100, the POS apparatus 300, and various servers.

The software and/or the data may be interpreted by the user equipment 100, the POS apparatus 300, and the mobile card service providing apparatus 200 or permanently or temporarily embodied by any type of machine, a component, a physical device, virtual equipment, a computer storage media or device, or a signal wave to be transmitted, in order to provide the instruction or the data to the user equipment 100, the POS apparatus 300, and the mobile card service providing apparatus 200.

The software is distributed on the computer system connected to the network to be stored and executed by a distributed method.

The software and the data may be stored on one or more computer readable media.

As described above, unlike the conventional application installed in the user equipment 100 managing the existing mobile card, the user equipment 100 for searching the mobile card based on pattern recognition in some forms of the present disclosure registers and stores different patterns for each mobile card in addition and displays the mobile card corresponding to an inputted pattern by searching a card desired to be used based on the inputted pattern by the user and accurately displays the mobile card desired to be used by the user through the user equipment 100, thereby user convenience of use of the mobile card and accuracy of the searching of the mobile card can be largely improved.

Due to such a configuration, in some forms of the present disclosure, it may be possible to largely improve inconvenience to input a search word suitable for accurately searching the desired mobile card of the user in addition to inconvenience to input the search word by the user in an conventional method for searching the mobile card, thereby user's convenience and user's satisfaction is improved.

Further, in some forms of the present disclosure, it may be possible to set different patterns for each mobile card and support the user to conveniently search the mobile card desired to be used in a shop only by the pattern input and simultaneously support the user to accurately find and use the desired mobile card, thereby convenience of use of the mobile cards stored in the user equipment 100 is largely improved.

Further, in some forms of the present disclosure, it may be possible to provide a pattern input interface for searching and displaying the mobile card on the locking screen of the user equipment 100 and support the user to use the mobile card with minimal operation by immediately displaying the corresponding mobile card based on the input pattern via the pattern input interface on the locking screen after recognizing the mobile card associated with the inputted pattern, thereby convenience of use of the mobile card is largely improved.

The method for searching the mobile card based on pattern recognition in some forms of the present disclosure may be implemented with a computer program, and codes and code segments configuring the computer program may be easily deduced by a computer programmer in the art. Further, the corresponding computer program may be stored in non-transitory computer readable storage media, and read and executed by the computer or the user equipment 100 and the mobile card service providing apparatus 200 in some forms of the present disclosure to embody the method for searching the mobile card based on pattern recognition.

The non-transitory computer readable storage medium includes a magnetic storage medium, an optical storage medium, and a carrier wave medium. The computer program embodying the method for searching the mobile card based on pattern recognition in some forms of the present disclosure may be stored and installed in embedded memories of the user equipment 100 and the mobile card service providing apparatus 200. Alternatively, external memories such as a smart card storing and installing the computer program embodying the method for searching the mobile card based on pattern recognition in some forms of the present disclosure may be installed on the user equipment 100 and the mobile card service providing apparatus 200 through an interface.

Various apparatuses and components described in the specification may be embodied by a hardware circuit (for example, a CMOS based logic circuit), firmware, software, or a combination thereof. For example, various apparatuses and components may be embodied by using a transistor, a logic gate, and an electronic circuit in the forms of various electric structures.

Hereinabove, although the present disclosure is described by specific matters such as concrete components, and the like, forms, and drawings, they are provided only for assisting in the entire understanding of the present disclosure. Therefore, the present disclosure is not limited to the forms. Therefore, some forms disclosed in the present disclosure are used to not limit but describe the technical spirit of the present disclosure and the scope of the technical spirit of the present disclosure is not limited by the forms. The scope of the present disclosure should be interpreted by the appended claims and it should be analyzed that all technical spirit in the equivalent range thereto is intended to be embraced by the scope of the present disclosure.

In some forms of the present disclosure, different patterns are set for each mobile card, and a mobile card which a user desires to use in a store may be conveniently searched only by inputting a pattern and the mobile card desired to be used by the user may be accurately found and used thereby use convenience of the mobile card stored in a user equipment is enhanced. Therefore, the present disclosure may be widely applied to an online shopping mall system field, various electronic wallet management system fields, a marketing system field, and the like.

What is claimed is:

1. A user equipment for searching a mobile card based on pattern recognition, the user equipment comprising:
a storage configured to store data associated with mobile cards and pattern information corresponding to each of the mobile cards;
a display system configured to display the mobile cards;
an input unit configured to receive user inputs;

a communication system configured to communicate with a mobile card service providing apparatus that issues the mobile cards; and an application system configured to:
- display a pattern input interface through the display system, the pattern input interface including a set of predetermined location points;
- receive a user input from a user via the input unit indicative of a search request for one of the mobile cards stored in the storage, the user input including a user selection of a first sequence of a plurality of the predetermined location points from the set displayed by the display system;
- generate user input pattern information based on the user input;
- identify, from the storage, a mobile card having pattern information that matches the user input pattern information; and display the identified mobile card via the display system,
wherein the application system is further configured to:
- receive list information associated with the mobile cards from the mobile card service providing apparatus through the communication system,
- display the received list information through the display system,
- receive, through the communication system, data associated with a selected mobile card selected by the user from the list information based on user selection through the input unit,
- store the received data associated with the selected mobile card in the storage,
- display, when the selected mobile card is a new mobile card, the pattern input interface,
- receive, via the input unit, a user input from the user of an initial pattern setting associated with the new mobile card, the initial pattern setting including a user selection of a second sequence of a plurality of the predetermined location points from the set, the second sequence distinct from the first sequence,
- generate the stored pattern information corresponding to the selected mobile card based on the second sequence of the plurality of the predetermined location points,
- store the stored pattern information corresponding to the selected mobile card and the data associated with the selected mobile card in the storage, and
- responsive to the stored pattern information corresponding to the selected mobile card generated for the initial pattern setting matching any of the stored pattern information stored in the storage, output error information indicative of a request for the user to input a third sequence of a plurality of the predetermined location points for association with the selected mobile card, the third sequence different from the second sequence.

2. A user equipment for searching a mobile card based on pattern recognition, the user equipment comprising:
- a storage configured to store data associated with mobile cards and pattern information corresponding to each of the mobile cards;
- a display system configured to display the mobile cards;
- an input unit configured to receive user inputs; and
- an application system configured to:
  - display a pattern input interface through the display system, the pattern input interface including a set of predetermined location points;
  - receive a user input from a user via the input unit indicative of a search request for one of the mobile cards stored in the storage, the user input including a user selection of a first sequence of a plurality of the predetermined location points from the set displayed by the display system;
  - generate user input pattern information based on the user input;
  - identify, from the storage, a mobile card having pattern information that matches the user input pattern information; and
  - display the identified mobile card via the display system,
  wherein the application system is further configured to:
  - display, when the user equipment is in a locking state, the pattern input interface in a locking screen through the display system,
  - generate the user input pattern information based on the user input including the user selection of the first sequence,
  - display the mobile card having stored pattern information that matches the user input pattern information by switching the locking screen to a screen for displaying the mobile card, and
  - release the locking state of the user equipment responsive to receiving via the input unit a user input including a second sequence of the plurality of the predetermined location points that is associated with predetermined pattern information for unlocking the user equipment, the second sequence distinct from the first sequence.

3. The user equipment of claim 2, wherein the application system is further configured to request from the user to set the predetermined pattern information for unlocking the user equipment to be different from the stored pattern information for each of the mobile cards.

* * * * *